United States Patent [19]

Suzuki et al.

[11] Patent Number: 4,947,384
[45] Date of Patent: Aug. 7, 1990

[54] OPTICAL DISK HAVING NARROW AND WIDE GUIDE GROOVES

[75] Inventors: Kenji Suzuki; Toshihiko Takishita; Satoru Fukuoka; Hirokazu Hashikawa; Tsuyoshi Hayashi; Minemasa Ohta, all of Yamanashi, Japan

[73] Assignees: Pioneer Electronic Corporation, Tokyo; Pioneer Video Corporation, Yamanashi, both of Japan

[21] Appl. No.: 180,500

[22] Filed: Apr. 12, 1988

[30] Foreign Application Priority Data

Apr. 13, 1987 [JP] Japan .................................. 62-90081

[51] Int. Cl.⁵ .............................................. G11B 3/72
[52] U.S. Cl. ............................. 369/279; 369/275.1; 369/100; 369/109; 369/111
[58] Field of Search ............... 369/100, 111, 112, 275, 369/277–279, 109

[56] References Cited

U.S. PATENT DOCUMENTS

| | | | |
|---|---|---|---|
| 4,494,226 | 1/1985 | Hazel et al. | 369/275 X |
| 4,517,668 | 5/1985 | Takaoka et al. | 369/279 X |
| 4,587,648 | 5/1986 | Ando | 369/275 |
| 4,716,560 | 12/1987 | Itonaga | 369/275 |
| 4,748,609 | 5/1988 | Yonezawa et al. | 369/275 X |

FOREIGN PATENT DOCUMENTS

| | | | |
|---|---|---|---|
| 60-236122 | 11/1985 | Japan | 369/279 |
| 60-247842 | 12/1985 | Japan | 369/279 |

Primary Examiner—Aristotelis M. Psitos
Attorney, Agent, or Firm—Sughrue, Mion, Zinn, Macpeak & Seas

[57] ABSTRACT

An optical disk of the type including guide grooves is improved by regulating the width of the grooves, and thus the width of the adjacent land portion, in accordance with the type of information recorded at that part of the land.

4 Claims, 2 Drawing Sheets

OPTICAL DISK HAVING NARROW AND WIDE GUIDE GROOVES

BACKGROUND OF THE INVENTION

This invention relates to an optical disk of the type including guide grooves, including the so-called "afterward write-in type" or the "DRAW (Direct Read after Write) type" optical disk.

FIG. 4 shows an example of a conventional optical disk of the type including guide grooves. In this disk, the lower side surface of a transparent circular substrate 1 (formed of PMMA, PC or the like) is provided with recesses and projections concentrically or spirally formed thereon and is wholly coated with a reflection layer 5 to form guide grooves 2 and land portions 3. Preaddress pits 4 are formed beforehand. The guide grooves 2 and the land portions 3 represent projections and recesses in the reflection layer 5 as viewed from the side from which laser beams for read-out and write-in are directed (the upper side in the figure). The substrate 1 is fixed or adhered to another substrate 7 through a spacer 6 in such a manner that an inner space is formed. The reflection layer 5 constitutes an inner side surface of this inner space.

FIG. 5 is a partially enlarged front view of a conventional guide groove-containing optical disk. The tracks are formed on the land portions 3. The portion indicated by character F corresponds to a preformat portion in which preaddress pits 4 are formed in advance to indicate an address signal Portion R corresponds to a recording portion in which pits 9 are formed afterward as recorded data (pit information) using a laser spot. The reflection layer 5 functions as a recording layer and comprises, for example, an organic dye which is sublimated or vaporized by a laser spot of prescribed power.

In a write-in operation, the writing laser beam is incident from the side of the substrate 1 and the spot thereof traces the land portion, to thereby read out an address signal using light reflected from the preaddress pits 4 on the preformat portion F, and then form pits 9 on the recording portion R to record information.

In a read-out operation, the read-out laser beam is actuated to trace the land portion 3 to read out the address signal from the preaddress pits 4 in the preformat portion and the information represented by the pits 9 recorded in the recording portion R.

A tracking servo mechanism is utilized for the trace of each laser beam along the land portion. The spot diameter of the laser beam for read-out is ordinarily within the width of the land portion and is larger than the diameter of the laser beam used for write-in, and the width of the preaddress pits.

In order to cause each laser beam to correctly trace the land portion, there is necessarily demanded an optical disk with guide grooves which increase the degree of modulation, that is, the degree of optical diffraction at the guide grooves, to enlarge the tracking signal and the track cross signal. For example, in order to enlarge the output of the tracking error signal utilizing a push-pull method, the maximum degree of modulation can be obtained when the guide grooves are designed so as to be $\lambda/8$ in depth, 1.6$\mu$in track pitch and 0.8$\mu$in width, where $\lambda$ represents the wavelength of the light, and the track pitch corresponds to the distance between the centers of a pair of guide grooves demarcating a land portion.

In order to satisfy the above conditions in the process of manufacturing the original plate of the optical disk, in a first stage, the spot of the laser beam is converged on a photoresist layer formed to a predetermined width on the glass original plate to expose the photoresist to a light while the original plate is rotated. Next, the original plate is developed and guide grooves having radially substantially U-shaped cross sections are formed on the original plate, to thereby demarcate the land portion. The guide grooves of substantially U-shaped cross section comprise side walls of photoresist and a bottom of exposed original plate; that is, the bottom of the guide groove reaches the original plate. The term "substantially U-shaped" does not constrain the relation between the width and depth of the groove, and includes a shape in which the bottom of the groove has a roundish periphery.

The main surface on which the guide grooves and the land portions are formed is coated with a reflection layer to complete the production of the original optical disk. Ordinarily, the glass original plate is used as a matrix to make a metal stamper of Ni or the like to duplicate a large number of PMMA substrates for optical disks therefrom. The duplicated PMMA substrates are coated with reflection layers to produce optical disks with guide grooves as shown in FIG. 4. However, the conventional optical disks as described above have a disadvantage in that the spots of the laser beams for write-in and read-out encroach more frequently on the edges of the guide grooves, so that the degree of modulation of the light reflected from the preformat portion is decreased and therefore the address signal is erroneously read out.

SUMMARY OF THE INVENTION

An object of this invention is to overcome the disadvantage associated with the conventional optical disk and provide an optical disk with guide grooves which can be easily manufactured.

The optical disk according to this invention is an information recording optical disk on which a recording layer having land portions demarcated by peripherally extending guide grooves is supported. The land portion comprises a preformat portion of broad width and a recording portion of narrow width.

DETAILED DESCRIPTION OF THE PREFERRED EMBODIMENTS

A preferred embodiment of this invention will be described in detail with reference to the accompanying drawings.

Figure 5:
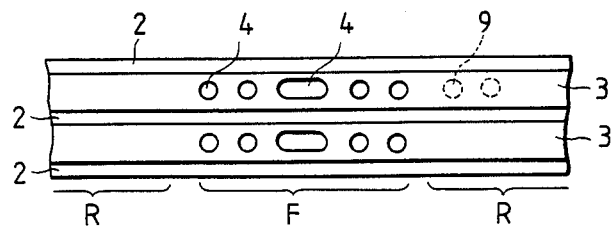
FIG. 5 is a partially enlarged plan view of the conventional optical disk having guide grooves.

FIG. 1($a$) and ($b$) are partially enlarged plan views of an embodiment of an original plate of an optical disk having guide grooves according to this invention. In these figures, components corresponding to those of the conventional optical disk shown in FIG. 5 are represented by the same reference numerals.

Figure 3A:
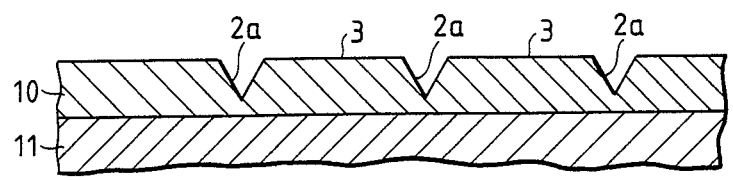
Figure 3B:
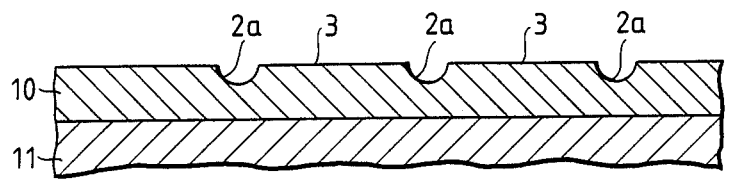

As shown in the figures, the guide groove 2a at the preformat portion is narrower in width than the guide groove 2 at the recording portions R. The guide groove at the preformat portion is designed so as to be shallow in depth and narrow in width as shown in FIG. 3(a) and (b), making the land portion broad in width in the radial direction, so that the laser spot for read-out can be prevented from encroaching on the guide groove. Further, the guide groove at the recording portion is designed in such a manner that the guide groove is substantially U-shaped and the edge portion of the recording portion is substantially in rectangular form, to thereby increase the degree of modulation of reflected light.

The production of guide grooves having different widths will be described hereinunder.

Figure 2:
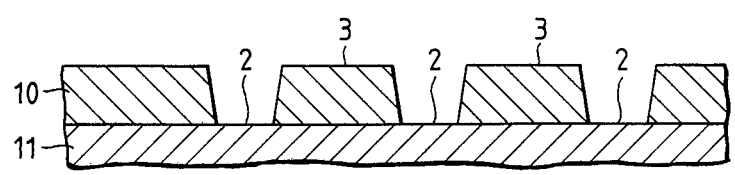
FIG. 2 and FIG. 3, $a$ and $b$, are partially enlarged sectional views of a glass plate formed in the process of producing guide grooves which is utilized in this invention.

In a case where a photoresist layer on the glass plate is exposed to an Ar laser beam while the original plate is rotated, portions corresponding to the guide groove of broad width are exposed to the Ar laser beam at an output power which is increased up to a predetermined level, and the other portions, corresponding to the guide groove of narrow width are exposed to the beam at an output power which is decreased down to a lower predetermined level. The exposed portions at the sites of the guide grooves are eliminated via the same development process used in the conventional technique, to demarcate the recording portion with guide grooves having substantially U-shaped cross sections as shown in FIG. 2, and to demarcate the preformat portion with guide grooves of, for example, V-shaped or part circular cross section as shown in FIG. 3(a) and (b). The latter grooves are shallower in depth and narrower in width than those of U-shaped cross section in FIG. 2. The guide grooves having substantially V-shaped or semi-circular cross section as described above are obtained using a laser beam, the spot center of which has a large light intensity. The cross section of the grooves can be varied from the substantial V-shape to the semi-circular shape by varying the lapse of development time of the photoresist. The guide groove thus produced has a shallower depth and narrower width than the conventional guide groove of substantially U-shaped cross section, the bottom of which is formed by part of the original plate.

Figure 1A:
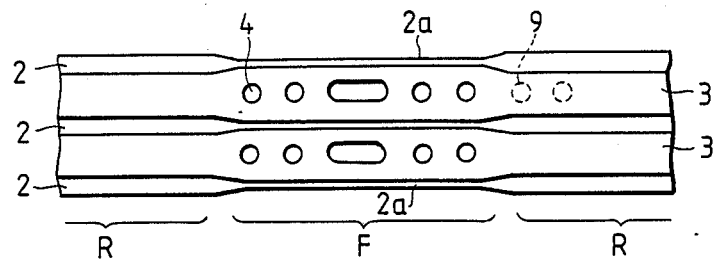
FIG. 1, $a$ and $b$, is a partially enlarged plan view of an optical disk having guide grooves according to this invention.
Figure 1B:
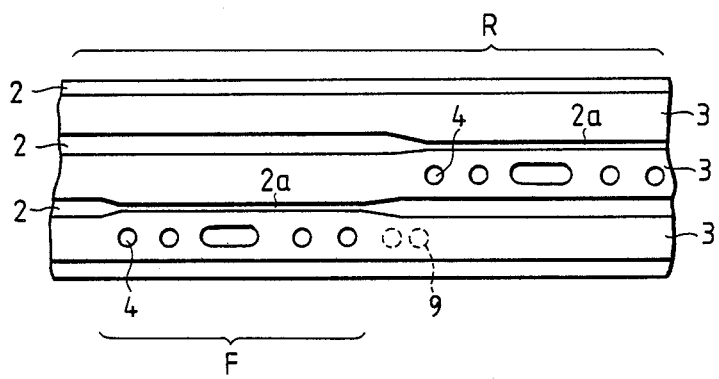

In the original plate of the optical disk according to this invention, the cross-sectional shapes of the guide grooves 2 and 2a at the recording portion R and the preformat portion F are independently formed. Therefore, the width of the recording portion is designed so as to be at an optimum width for obtaining the tracking error signal and track cross signal, and the width of the preformat portion is designed so as to be at an optimum width causing the degree of opening of the eye pattern of the preaddress signal to be above a predetermined value, to thus reduce read-out errors. For example, since the land portion is made maximally broad in width when the preformat portions F are radially juxtaposed with each other as shown in FIG. 1(a), encroachment of the laser spots for read-out and write-in on the edges of the guide grooves is reduced. Further, when the preformat portions F are formed such that they are shifted one by one in the radial direction as shown in FIG. 1(b), the preformat portion can still have a broader width than the recording portion even if only one of the guide grooves is narrowed, so that read-out errors can be reduced.

As described above, by changing the output power of the laser beam in the process of producing guide grooves, guide grooves of the recording portions, which occupy the larger portion of the original plate, are designed so as to be U-shaped in cross section, and the guide grooves of the preformat portions are designed so as to be shallow in depth and narrow in width. In this manner, an original plate of an optical disk can be stably produced using a development process in which apparatus such as a development monitor or the like is not needed.

It is possible to make an optical disk in which all of the land portions are demarcated by guide grooves having narrow width. The guide grooves are desirably narrow in width so that the opening degree of the eye pattern of the address signal can be set above a threshold value to decrease the read-out error. To ensure a stable output of tracking error and track crossing signals having above-threshold values, the development time of the photoresist must be accurately controlled while the guide grooves of substantially V-shaped or semi-circular cross section are formed.

This requires a development monitor for supervising development and exposure of the photoresist at all tracks of the disk. Therefore, in the process of manufacturing such an optical disk, i.e., a disk having guide grooves of shallow depth, the bottoms of which do not reach the glass original plate, the mastering process is complicated and therefore the production yield of such original plates is decreased. There occurs no such problem in the optical disk according to this invention, because only the preformat portion is demarcated by guide grooves of shallow depth.

Figure 4:
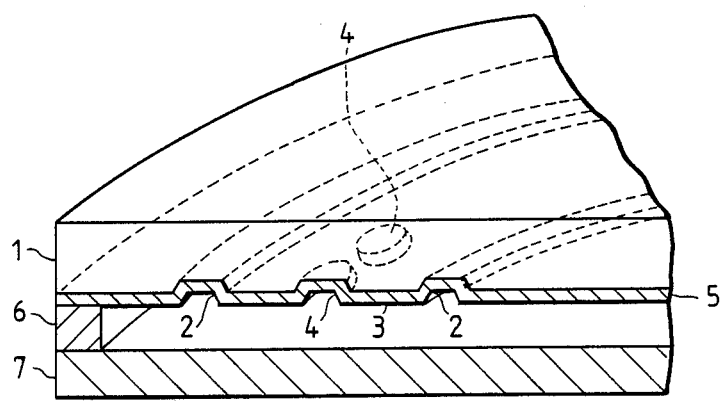
FIG. 4 is an enlarged perspective view of a cut-out portion of a conventional optical disk.

The guide grooves of the glass original plate thus obtained and the main surface supporting the land portion are coated with a reflection layer to produce an optical disk having guide grooves. As in the conventional technique, the original plate may be used as a matrix to make a metal stamper from which a large number of PMMA substrates for optical disks may be made. Thereafter the PMMA substrates are coated with reflection layers to complete the production of the optical disks, as shown in FIG. 4.

In this embodiment, an optical disk of the subsequent write-in type was described However, the invention is applicable to an optical magnetic disk having guide grooves In the invention, a land portion of the optical disk comprises a preformat portion and a recording portion having a broad width and a narrow width, respectively, in the radial direction, so that the read-out error of the address signal is decreased, and a track crossing signal enlarged above a threshold value can be obtained.

We claim:

1. An optical disk, comprising:
    guide grooves formed concentrically or spirally on the disk; and
    land portions each provided between adjacent ones of said guide grooves, said land portions including a signal recording region and a preformat region on which concave/convex pits having address information are formed;
    wherein said preformat region of said land portions has a substantially uniform width which is broader, in the radial direction of the disk, than that of said signal recording region, and a first portion of said guide grooves adjacent to said preformat region has a substantially uniform width which is narrower, in the radial direction of said guide grooves, than that of a second portion of said guide grooves which is adjacent to said signal recording region.

2. An optical disk as claimed in claim 1, wherein a first portion of said guide grooves demarcating said preformat portion is narrower in width and shallower in depth than a second portion of said guide grooves demarcating said recording portion.

3. An optical disk as claimed in claim 2, wherein said guide grooves at said first portion are one of V-shaped and part circular in cross section.

4. An optical disk as claimed in claim 2, wherein said guide grooves at said second portion are U-shaped in cross section and have bottom surfaces defined by a substrate surface of said disk.

* * * * *